INVENTORS
KENNETH R. RUNYAN
ELMER G. TAYLOR, JR.
BY
Joseph A. Rave
Attorney

INVENTORS
KENNETH R. RUNYAN
ELMER G. TAYLOR, JR.
BY
Joseph A. Rave
Attorney

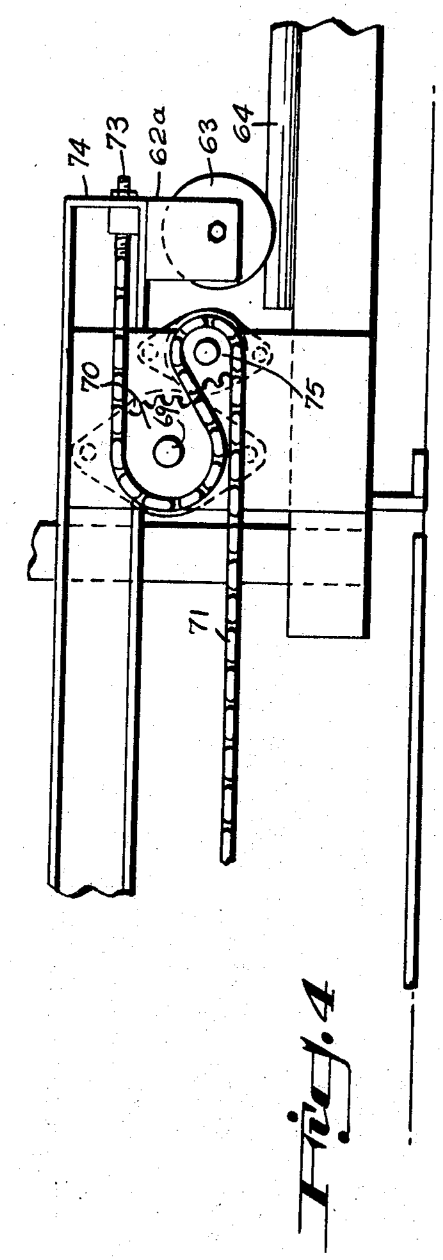
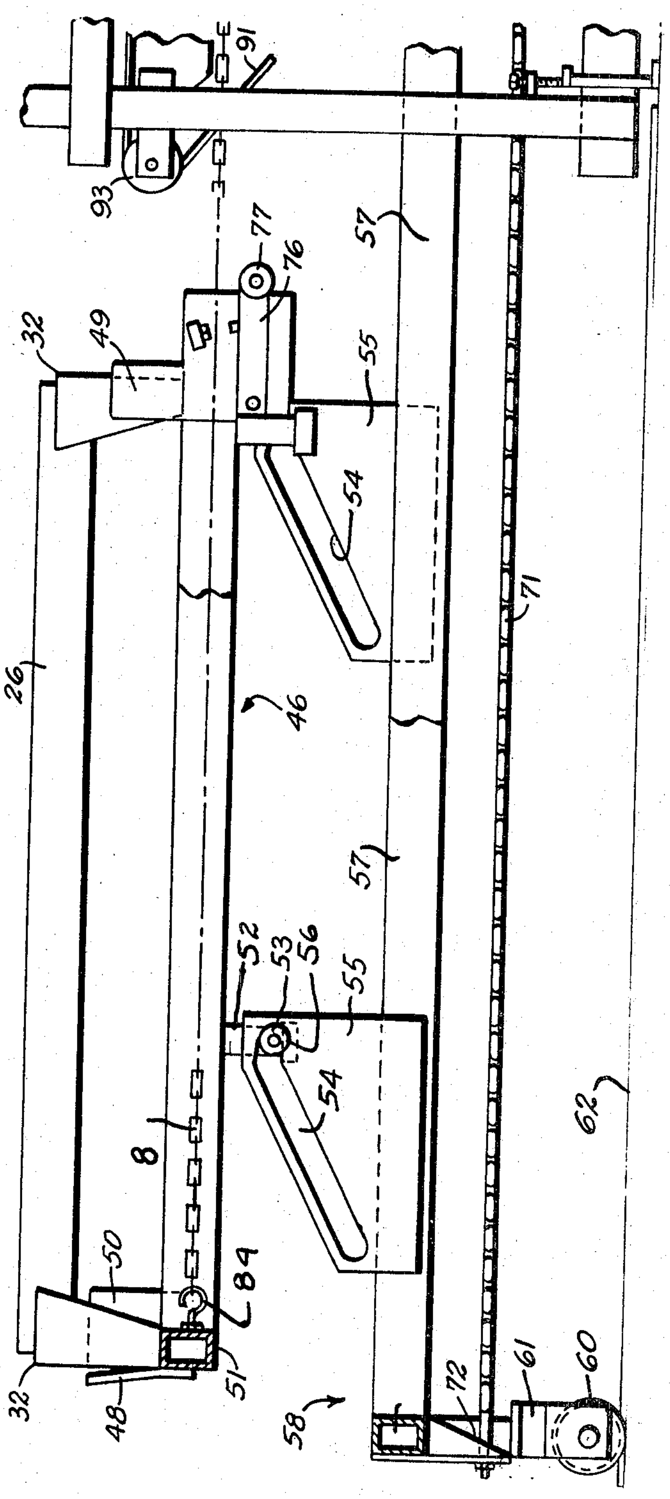
Fig. 3
INVENTORS
KENNETH R. RUNYAN
ELMER G. TAYLOR JR.
BY Joseph A. Rave
Attorney INVENTORS
KENNETH R RUNYAN
ELMER G. TAYLOR JR.
BY Joseph A. Rave
Attorney INVENTORS
KENNETH R. RUNYAN
ELMER G. TAYLOR JR.
BY Joseph A. Rave
Attorney INVENTORS
KENNETH R. RUNYAN
ELMER G. TAYLOR JR.
BY Joseph A. Rave
Attorney INVENTORS
KENNETH R. RUNYAN
ELMER G. TAYLOR, JR.
BY Joseph A. Rave
ATTORNEY INVENTORS
KENNETH R. RUNYAN
ELMER G. TAYLOR, JR.
BY Joseph A. Rave
Attorney INVENTORS
KENNETH R. RUNYAN
ELMER G. TAYLOR JR.
BY Joseph A. Rave
Attorney INVENTORS
KENNETH R. RUNYAN
ELMER G. TAYLOR, JR
BY Joseph A. Rave
Attorney INVENTORS
KENNETH R. RUNYAN
ELMER G. TAYLOR, JR.
BY Joseph A. Rave
Attorney United States Patent Office 3,528,576

Patented Sept. 15, 1970

3,528,576
FEEDING MECHANISM

Kenneth R. Runyan, Mount Carmel, and Elmer G. Taylor, Jr., Norwood, Ohio, assignors to Tech-Art, Inc., Milford, Ohio, a corporation of Ohio Filed June 30, 1967, Ser. No. 650,354
Int. Cl. B65b *21/02;* B65g *65/34;* B65h *31/34*
U.S. Cl. 214—310 17 Claims

ABSTRACT OF THE DISCLOSURE

The feeder mechanism is adapted to receive stacks of folded cartons or carton blanks which have been delivered to the feeder on a skid. The feeder removes the individual stacks from the skid and subsequently deliver each stack to a dispensing mechanism, individually, for feeding said flat folded cartons or carton blanks individual from each stack for further operation thereof. Each skid upon being relieved of its load is arranged one on top of the other for subsequent removal as a group by a lift truck or the like.

This invention relates to improvements in a feeder mechanism, that is, a mechanism for feeding flat objects such as carton blanks or flat folded blanks individually to a mechanism for effecting a further operation.

An object of this invention is the provision of a mechanism adapted to receive a plurality of stacks of relatively flat individual pieces such as folded cartons, blanks from which the cartons are to be folded, and the like; the drawings and specification of this application being specifically described with relation to "unfolded" flat carton blanks for feeding to a "sealing machine."

Another object of this invention is the provision of a mechanism for accomplishing the foregoing object and in which the stacks or piles of blanks are received by the mechanism on a skid delivered to the mechanism by a lift fork truck or the like.

Another object of this invention is the provision in a mechanism as above indicated and wherein the skids are stored by and within the mechanism upon having their stacks removed so that said skids may be removed from the mechanism in a single group or pile of stacked skids.

Other and specific objects of the present invention is the provision of means which permits the operation of the feeding mechanism only when a sufficient number of blanks are in the feeder to be fed; means cooperating with the feeding mechanism and subsequently operating the machine to insure the blanks being singly and individually fed thereby prohibiting any jamming whatsoever either in the feeding mechanism or the machine following the feeding mechanism; mechanism to prevent the discharge of the stacks or piles of flat articles being removed from the skid unless the said piles are definitely in proper position both with respect to one another and to their supporting skid.

Other objects and advantages of the present invention should be readily apparent by reference to the following specification considered in conjunction with the accompanying drawings forming a part thereof and it is to be understood that any modification may be made in the exact structural details there shown and described, within the scope of the appended claims, without departing from or exceeding the spirit of the invention.

In the drawings:

FIG. 3 is an enlarged, longitudinal, sectional view through one section of the mechanism as seen from line 3—3 on FIG. 2.

FIG. 4 is an enlarged, fragmentary, portion of the end of the first section of the mechanism for driving the skid supporting carriage as seen from line 4—4 on FIG. 2.

Figure 2:
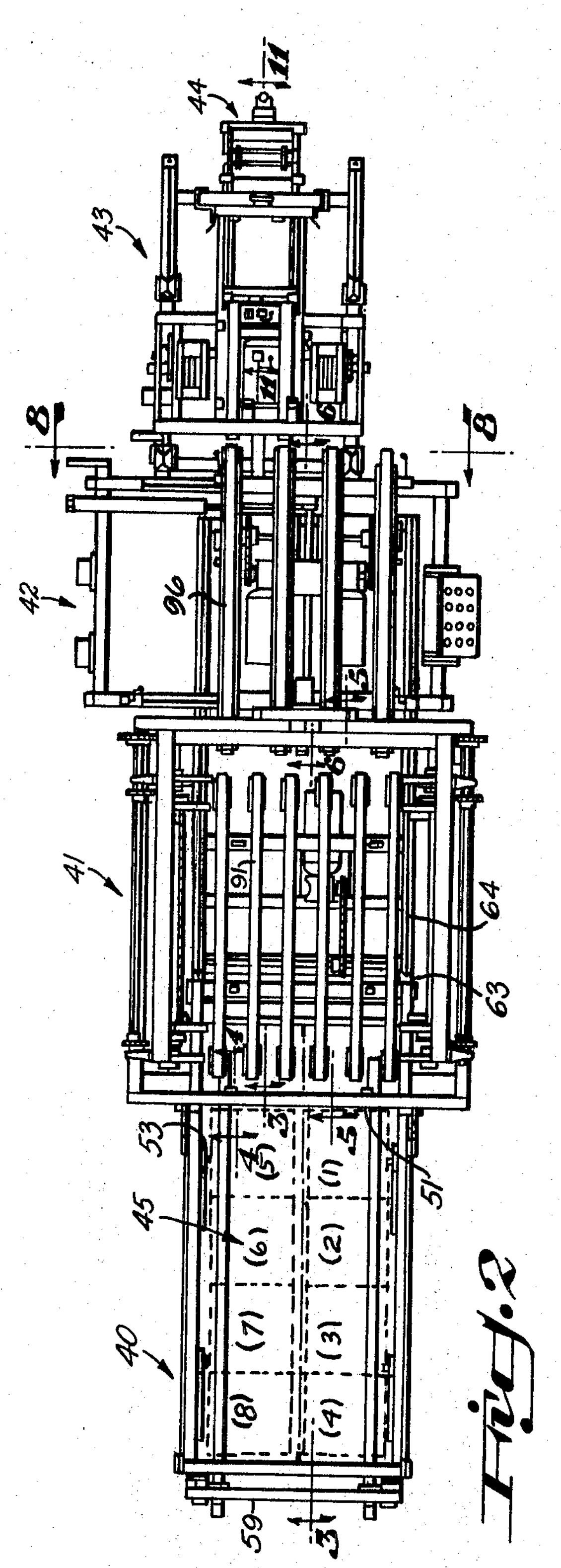
FIG. 2 is a top plan view of the mechanism in FIG. 1.
Figure 11:
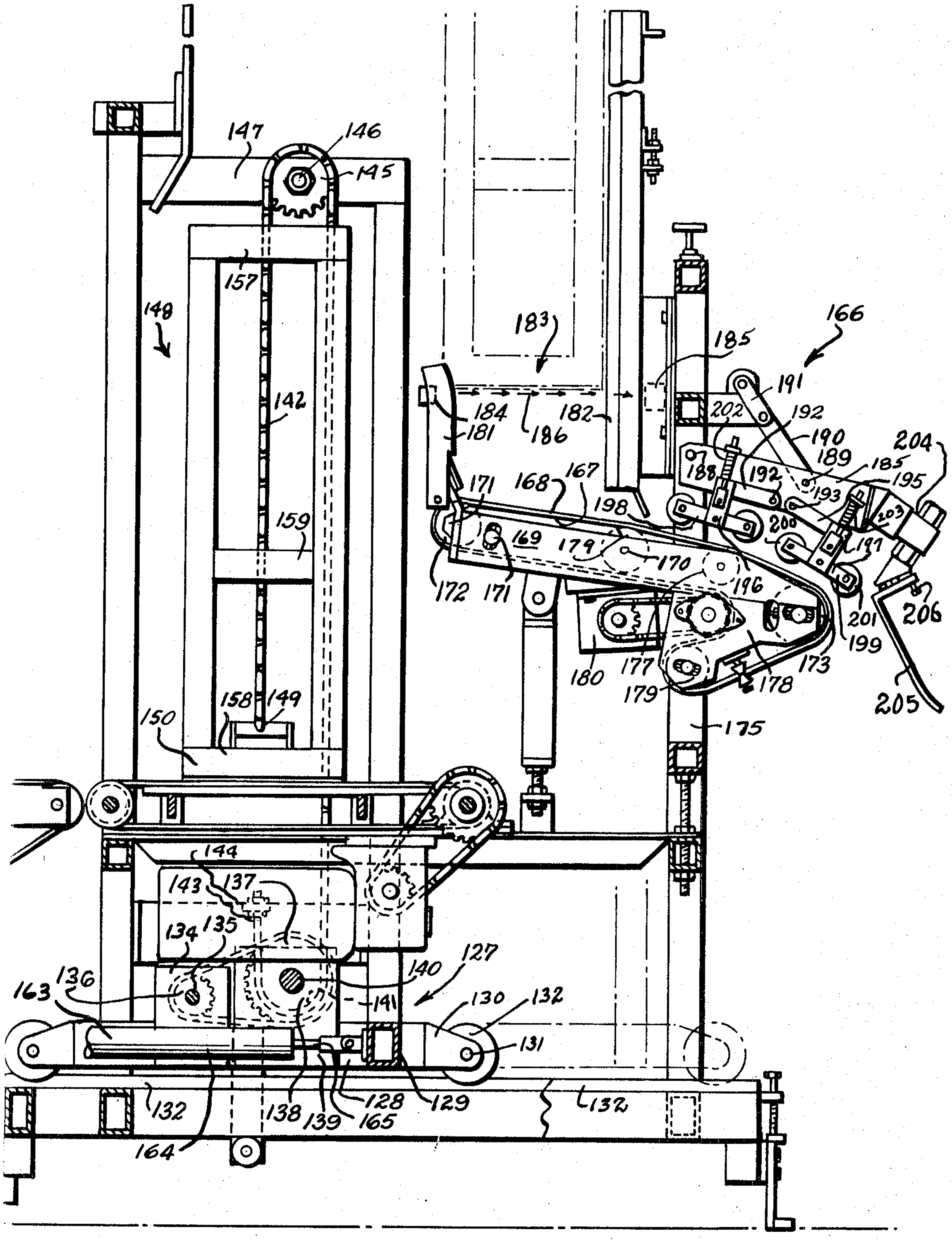

FIG. 11 is a vertical, sectional, view through the sections 4 and 5 of the feeding mechanism as seen from line 11—11 on FIG. 2.

Figure 12:
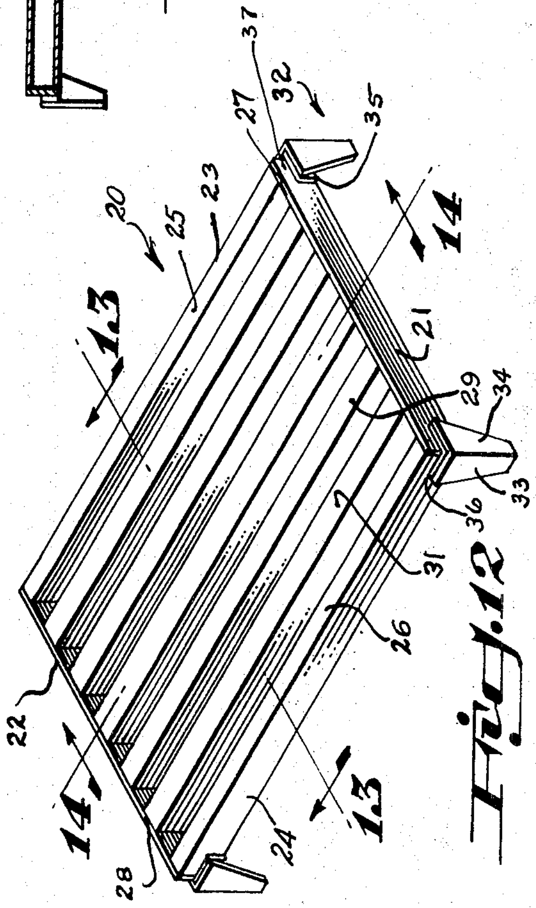

FIG. 12 is a perspective view of a skid as used with the present feeding mechanism and forming a detail of the present invention.

Figure 13:
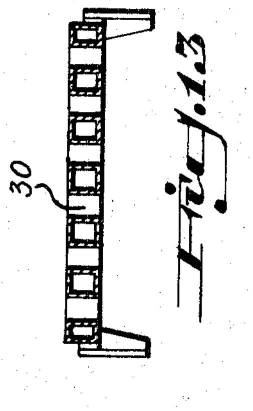

FIG. 13 is a transverse, sectional view of the skid of FIG. 12 as seen from line 13—13 on said FIG. 12.

Figure 14:
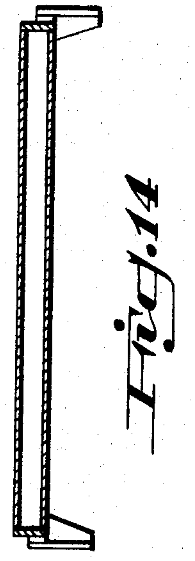

FIG. 14 is a longitudinal, sectional view through the skid of FIG. 12 as seen from line 14—14 on FIG. 12.

Figure 15:
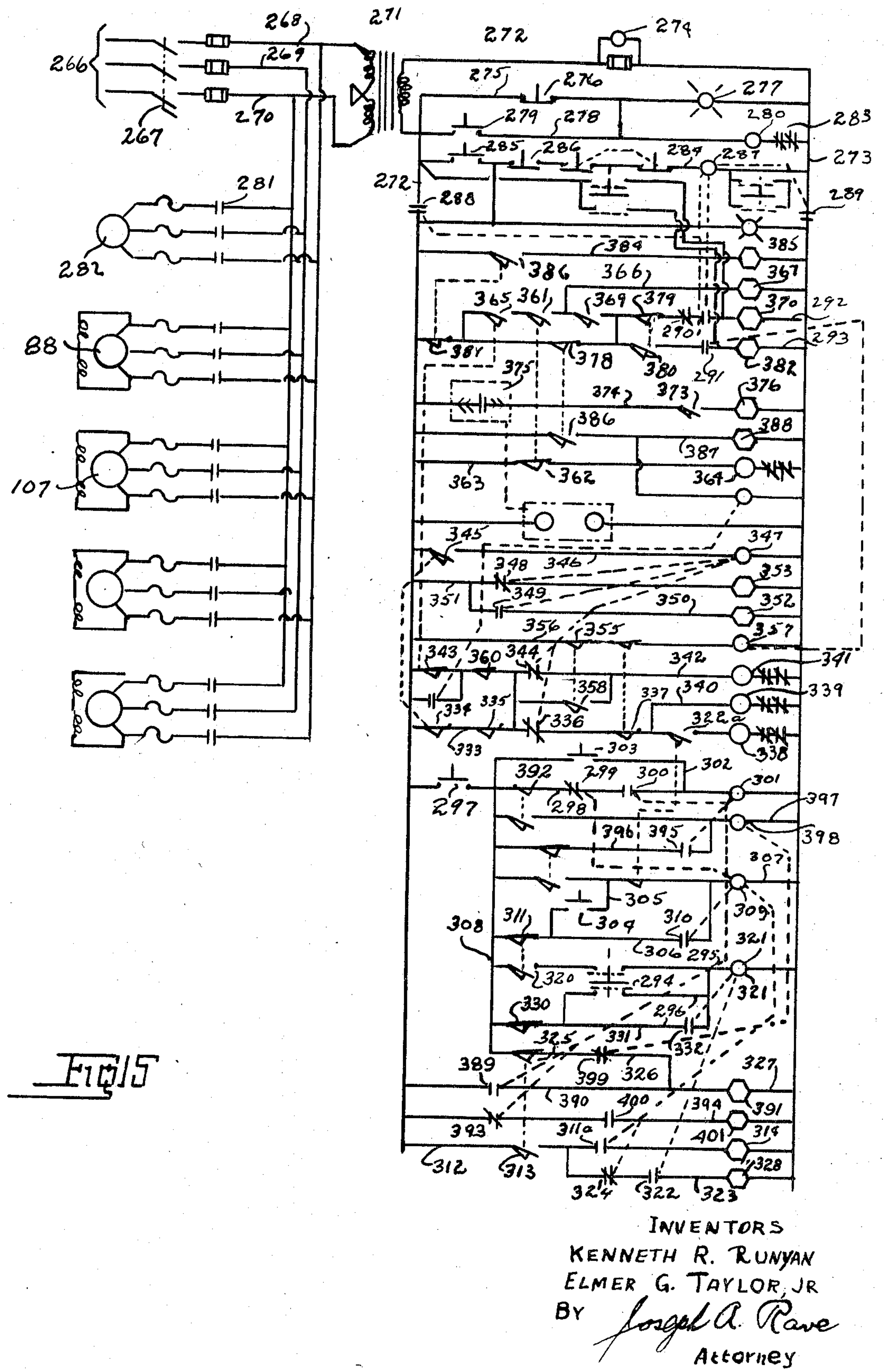

FIG. 15 is a diagrammatic view of the electrical circuit forming a detail of the present invention.

Figure 16:
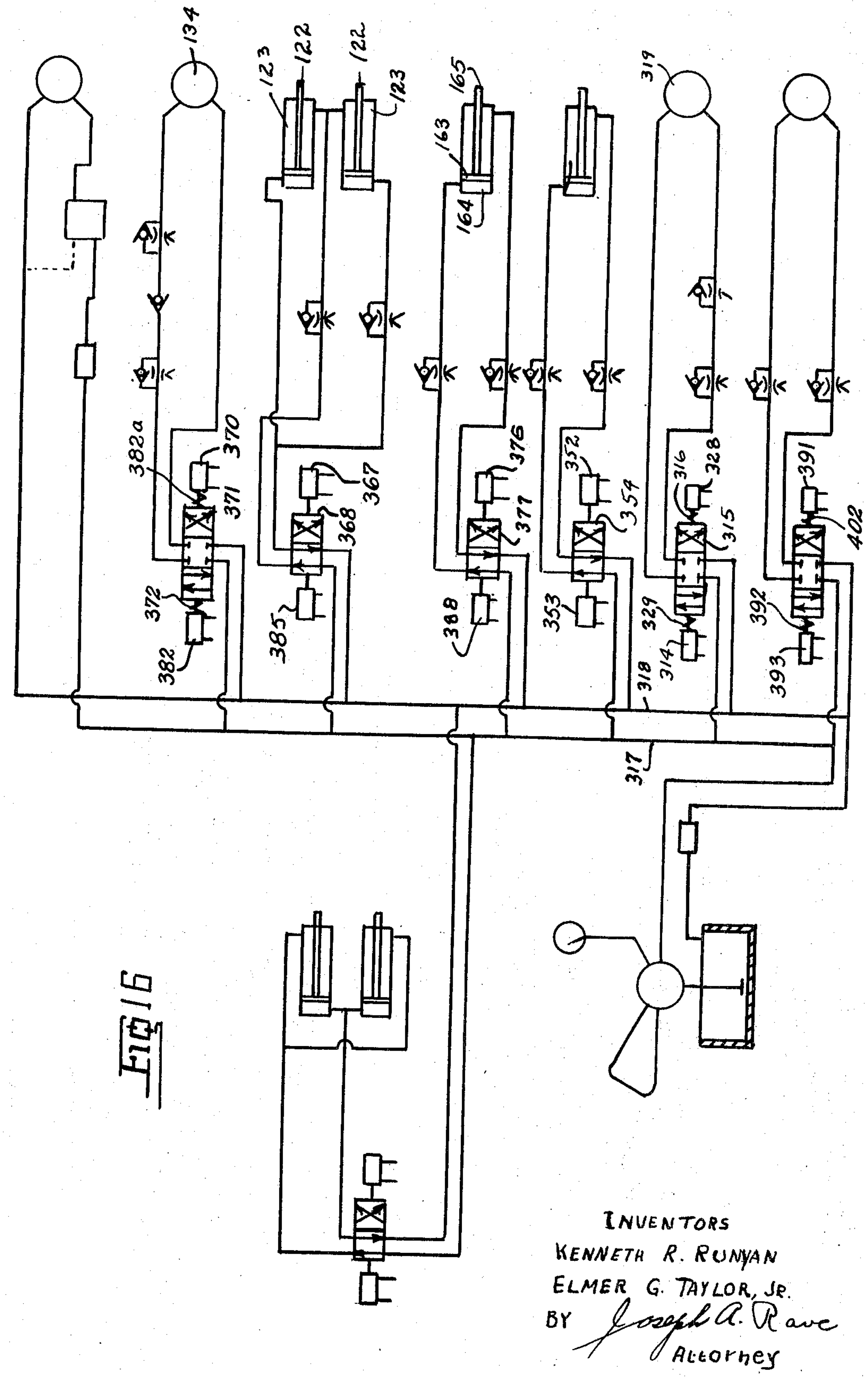

FIG. 16 is a diagrammatic view of hydraulic circuit and the various motors operating and controlling the operation of the feeding mechanism of the present invention.

Throughout the several views of the drawings similar reference characters are employed to denote the same or similar parts.

Before describing the mechanism or feeder of the present invention it is believed it would be helpful to describe the skid utilized with the present invention and which in and of itself forms a detail of the present invention. The said skid is specifically illustrated in FIGS. 11, 12 and 13 and is indicated in its entirety by the reference numbered 20.

As shown in said FIGS. 11, 12 and 13, the improved skid of the present invention employs a pair of end or frame members 21 and 22 and which have a length considerably less than the length of the skid and which end members 21 and 22 constitute the front and rear ends of the skid. The said end frame members 21 and 22 are joined to one another through longitudinal side members 23 and 24. Said side members as seen in FIG. 12 are formed as metal tubes rectangular in cross section and of a height equal to the height of the end frame members 21 and 22. The upper surfaces 25 and 26 of said longitudinal side members 23 and 24 are in a plane with the upper edges 27 and 28, respectively, of said end members 21 and 22.

Extending between said end members 21 and 22 and equally spaced transversely of the longitudinal side members 23 and 24 are intermediate longitudinal members 29, each identical with the other and rectangular in cross section, preferably, square and having its dimensions determined by the skid end members 21 and 22.

There is provided between each of the longitudinal side members 23 and 24 and the longitudinal members 29 a space 30 for a purpose subsequently to be made clear. It should be here noted that each of the intermediate longitudinal members 28 has its upper surface 31 in line with the upper edges or surfaces 27 and 28 of the end members 21 and 22 which would also place said intermediate longitudinal members upper surfaces 31 in a coplaner relation with the upper surfaces 25 and 26 of the longitudinal side members 23 and 24. By this construction there is provided a smooth upper surface for the skid, that is, a horizontal plane including the upper surfaces of all of the longitudinal and end members of the skid.

The skid is adapted to be supported at each corner by a leg indicated in general by the reference numbered 32 with each leg including a pair of wings or side members 33 and 34 formed by bending the metal of the leg to have the said members 33 and 34 disposed at right angles to one another.

The said legs 32, and particularly their side members 33 and 34, are respectively secured, by welding or the like to supporting and spacing plates 35 and 36 which in turn are respectively welded to the end members 21 and 22 and the longitudinal side members 23 and 24.

It will be noted that each of the legs along with its spacer plate is secured to the skid members a similar distance 37 downwardly of the upper surfaces of the skid end members 21 and 22 thereby providing a shoulder at the upper ends of each leg sides or wings 33 and 34 and upper edge of each spacer block 35 and 36 and the upper surfaces of which members of each leg is in the plane of similar surfaces of each of the other legs. It should be noted that there is to be no welding at the upper surfaces but only on the face surfaces which respectively contact one another and wherefore a clean shoulder is provided at the upper ends of each leg and its spacing 35 and 36.

Since a number of these skids would be employed with the feeding mechanism to be hereinafter described, the said shoulders constitute supports for the lower edges of the supporting legs for the subsequent skid to be placed on one another and which again will be subsequently clearly defined.

The feeder or feed mechanism may be said to consist of four or five integrated sections including the section to initially receive the skid with its stacks of articles to be fed and which section is indicated in its entirety by the reference numeral 40, the skid transfer mechanism and skid stacker mechanism indicated in its entirety by the reference numeral 41, the individual stack transfer mechanism indicated in general by the reference numeral 42, the stack lift and shifting mechanism indicated in general by the reference numeral 43 and the discharge mechanism indicated in general by the reference numeral 44.

Figure 1:
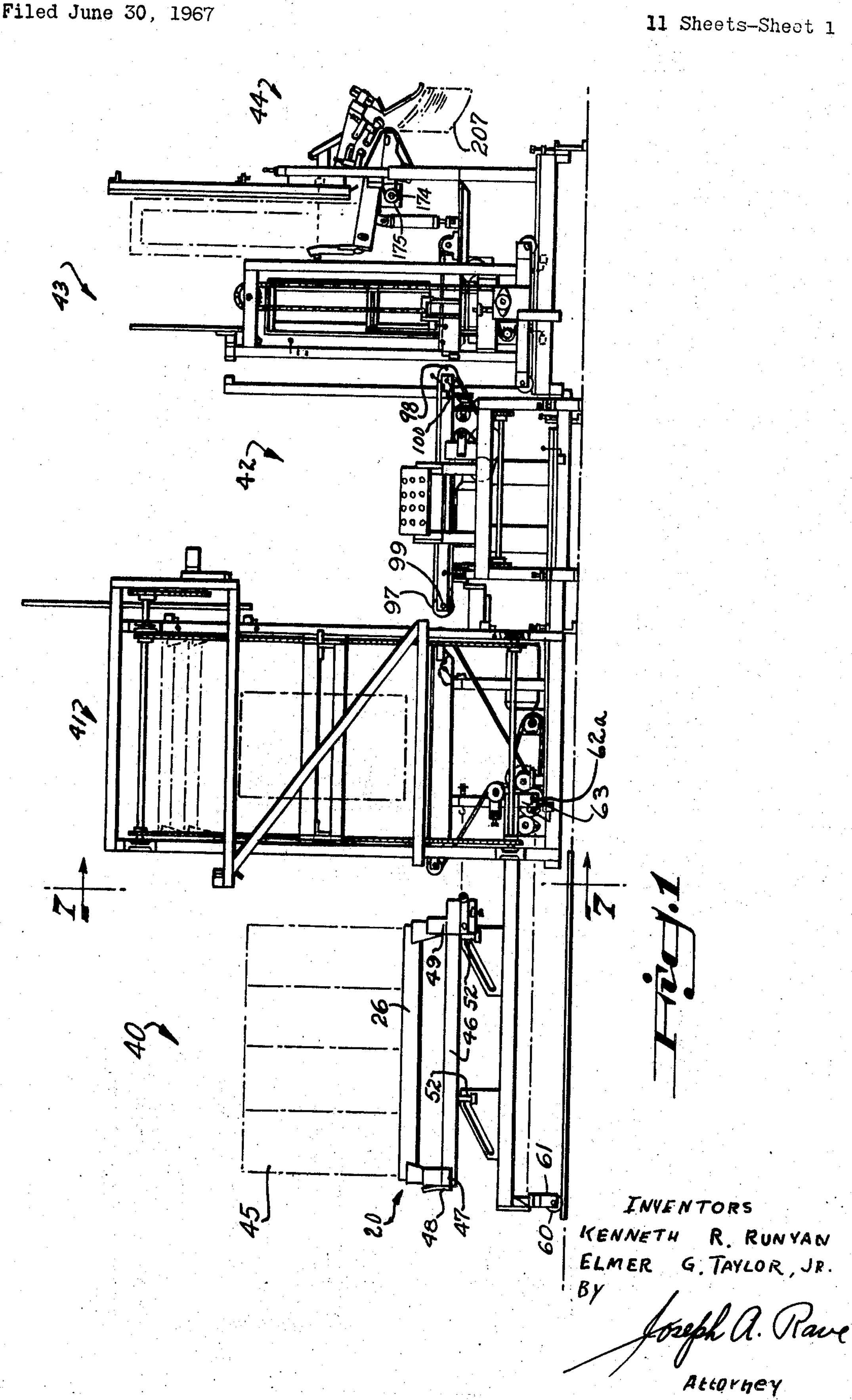
FIG. 1 is a side elevational view of the feeding mechanism of the present invention and which accomplishes the foregoing objects.

A skid, such as above-described, has thereon a plurality of stacks of articles to be individually fed by the article feeding mechanism 44. The mechanism of the present invention is set up to handle eight stacks of articles but it is to be understood that by simply readjusting the sequential operation of the parts other numbers of stacks are useable. As shown in FIG. 1 a skid 20 has been placed in the first section of the mechanism and the skid has thereon along one side thereon, as seen in FIG. 2, four stacks of carton blanks, such stacks being illustrated in dot and dash lines and indicated in general by the reference numeral 45. By reference to FIG. 2, it will be seen that a second group of four stacks is mounted on the skid behind the first group and which stacks of each side is indicated in general by the reference numeral 45. The said stacks, after placement of the skid are visually inspected to be sure they are in the proper relation to one another and to the skid surface and also that the blanks are headed in the proper direction for the sequential operation of the mechanism or machine.

The said section 40 of the machine comprises a skid supporting frame indicated in general by the reference numeral 46, and including a pair of facing angle irons 47 which have at their outer ends at the opposite corners thereof, a pair of plates 48 and 49 at right angles to one another and with said plates above the angle irons 47 slightly outwardly bent to act as centering guides for the skid legs 32 as the skid and its stacks of blanks 45 are lowered home. At the forward end of said skid support side mechanism angle irons 47 on each outer side thereof there is provided a guide plate 50 which may likewise be slightly outwardly extended to position the skid.

The skid supporting frame side members are angle irons 47 have their outer ends spaced from one another by a transverse spacer 51 and their inner ends presently to be described for thereby completing a skid supporting platform. Inwardly of each end of the skid supporting platform sides 47 they are provided with a depending finger 52, see also FIG. 3, having thereon a roller 53 which in effect hold the skid platform and stacks of cartons in the position thereof illustrated in FIG. 1.

The rollers 53 are respectively disposed in a cam-like slot 54 formed in a stationarily mounted cam plate 55. The upper end of the cam slot 54 of each cam plate 55 is provided with a downwardly formed seat 56 for the rollers 53 and which seats prevent any inadvertent movement of the platform 46 after the skid has been placed thereon.

The cam plates 55 are, respectively, upwardly projecting from side members 57 of a movable rectangular carriage, indicated in general by the reference numeral 58. The sides 57 of the movable carriage 58 are joined to one another at its outer ends by a transverse member 59.

As seen most clearly in FIG. 1 the carriage 58 has depending from its rearward corners a wheel support 61 each including a small supporting wheel 60 disposed on the upper surface of a flat metal track 62.

The inner ends of the carriage side members 57 are likewise provided with wheel supports 62*a* having wheels 63 rotatably carried thereby. Said wheels 63 are, see FIGS. 2 and 4, grooved and each disposed on a track 64 having the sides thereof inclined to receive the groove of the wheels 63 and wherefore the carriage with its skid and load is prevented from lateral displacement during the movement thereof longitudinally of the machine as will presently be made clear.

The said carriage with its skid load is adapted to be moved, through control means subsequently to be set forth, by a hydraulic motor unit 65 mounted inwardly of the said carriage on a frame member of the mechanism. Said motor unit 65 actuates a chain sprocket 66 about which is mounted a sprocket chain 67 in turn extending about a sprocket 68 on a shaft 69 journaled in suitable bearings carried by the main machine frame and at the bottom of the skid stacker mechanism 41.

Figure 7:
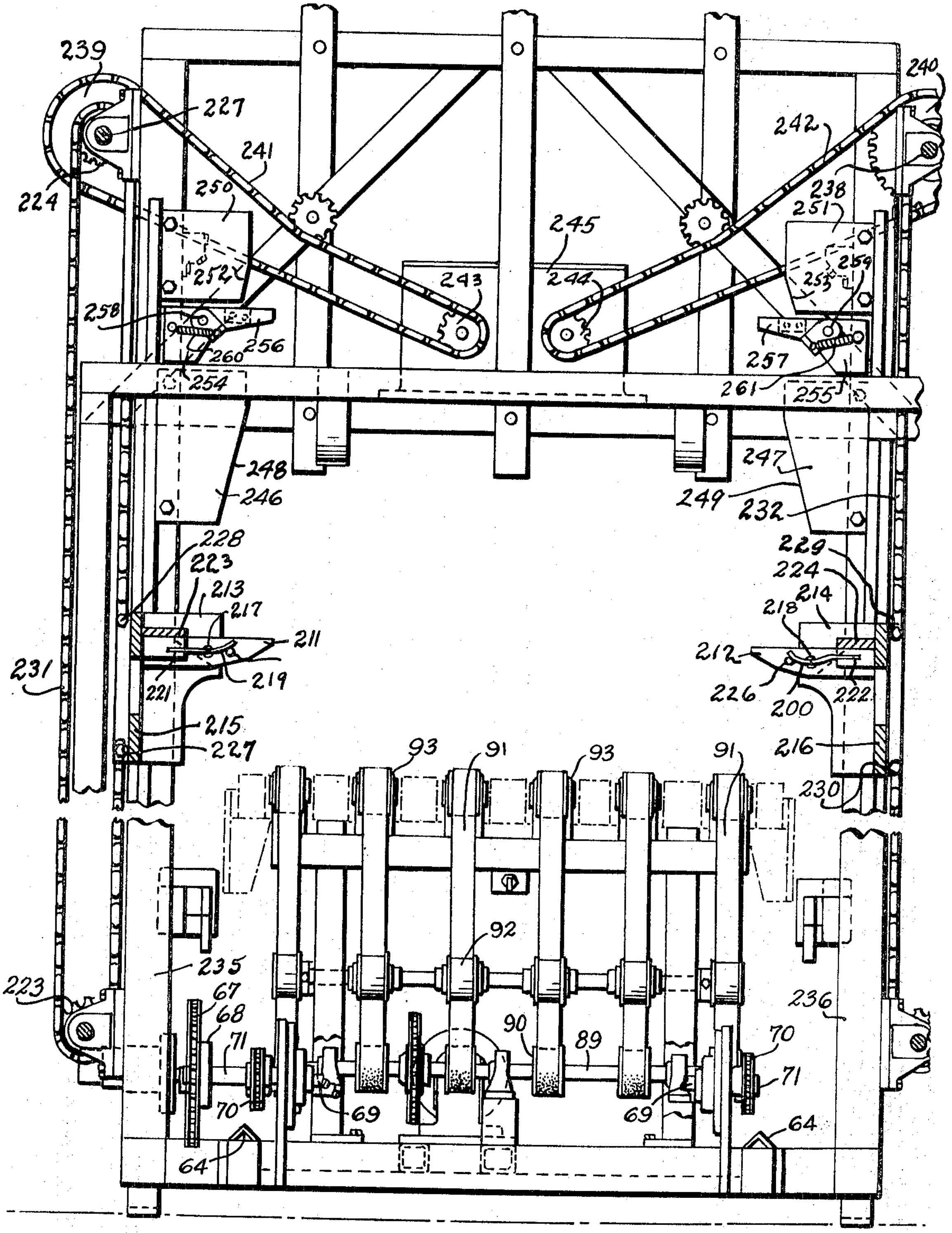
FIG. 7 is an enlarged, vertical, sectional view of the second section of the feeding mechanism as seen from line 7—7 on FIG. 1 with portions omitted in the interest of clearness of operation.

Connected with the shaft 69, see FIG. 7, slightly inwardly of each end thereof is a chain sprocket 70 about which is trained a pull or actuating chain 71 each secured to a corner of the carriage transverse member 59, through a hook or the like 72 (see FIGS. 1 and 3).

The other end of the pull or actuating chain 71 is secured to a second hook 73, carried by a member 74 of the carrier frame. The said pull or actuating chain 71 between the driving sprocket 70 and second hook 73 passes over a take-up and aligning sprocket 75.

From the foregoing it will be understood that rotation of the chain sprocket 70 actuates the carriage from the outer or loading position illustrating in solid lines in FIG. 1, to a position within the skid stacker mechanism 41 at a point above the mechanism which brings it into position to have discharged therefrom the carton blank stacks 45.

Figure 5:
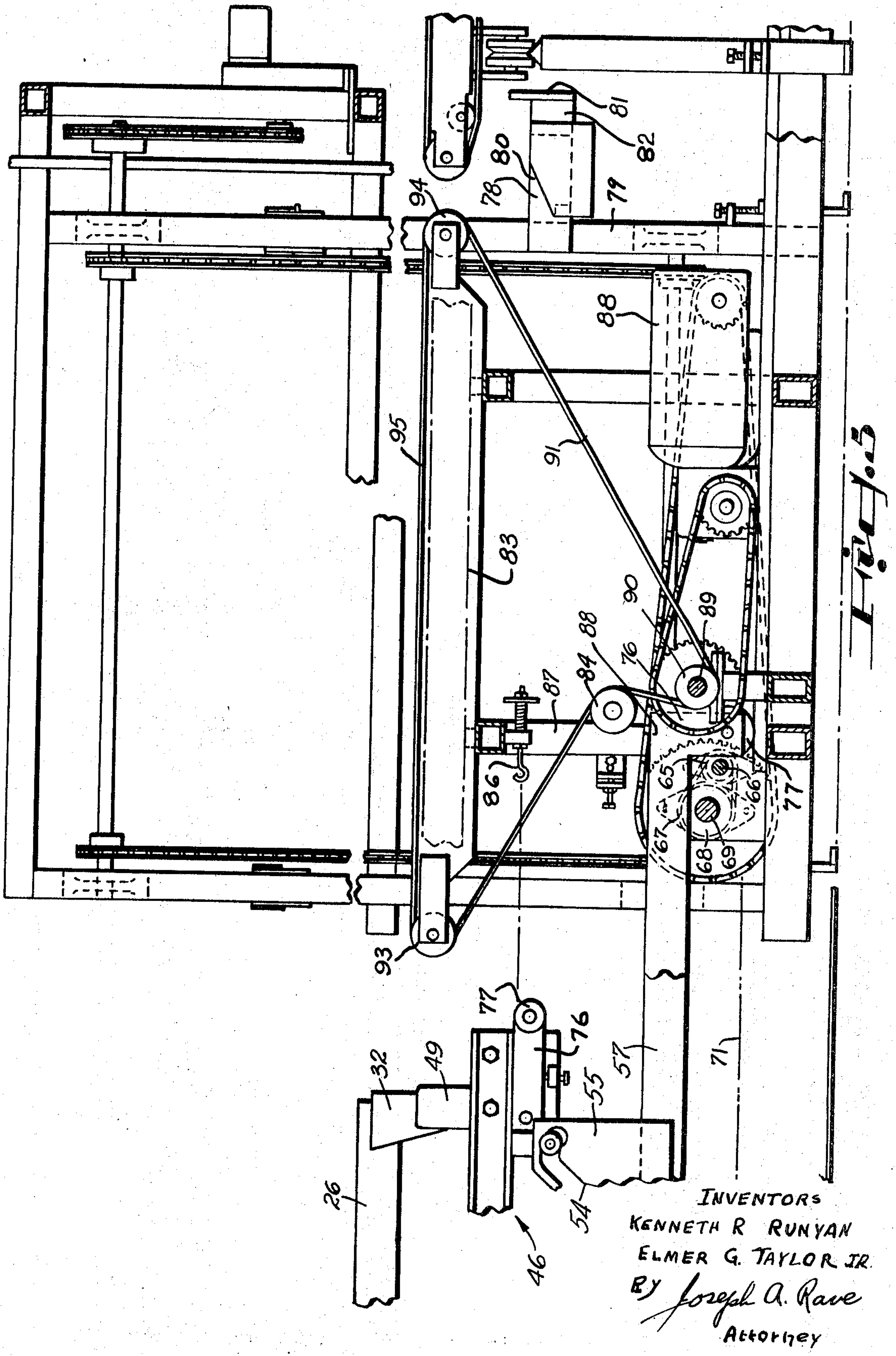
FIG. 5 is an enlarged, longitudinal, sectional view through the second section of the feeding mechanism as seen from line 5—5 on FIG. 2.

Mounted at the forward corners of the skid supporting frame 46 are arms 76 each having at its outer end a roller 77. The skid supporting frame 46 is drawn into operative position by engaging the roller 77 with a bracket 78, see FIG. 5. This bracket 78 is secured by an upright 79 of the main frame and in effect positions the skid with its blank stacks with respect to the skid stacker mechanism 41. The bracket 78 includes an inclined section 80 and a back-stop 81 with a downward exterior space 82 therebetween. Upon engagement of the said roller 77 with the bracket 78, the skid supporting frame 46 is first raised to lift its roller 53 from the cam pockets 56 and then held against further movement by the back-stop 81 while the skid carriage frame 57 is further moved inwardly of the machine as a whole.

The engagement of the roller 77 with its arresting bracket or backstop 81 causes the rollers 53 of the skid supporting frame arms 46 to be first upwardly raised from the pockets at the inner ends of the cam tracks 54 of the cam plates 55. Continued motion forwardly of the carriage frame 57 withdraws, in effect, the cam plates 55 from beneath the carriage 46 thereby permitting the carriage 46 along with its supported skid and stacks of carton blanks 45 to be lowered until the skid is supported in the position thereof indicated by the broken lines 83 in FIG. 5 and the said carriage support frame 57 continues to move until the carriage 46 is in its lowermost position, again, as illustrated in dotted lines 83 in FIG. 5 of the drawings.

As soon as the said carriage moving frame 46 reaches its innermost position and is freed of skid and its load, through control mechanism subsequently to be described, the carriage frame 58 and skid supporting frame 46 are actuated to their normal position outwardly of the machine.

It will be noted that the transverse forward member 51 of the carriage 46 is provided with a hook 84 to which is attached one end of a tie member, conveniently in the form of a chain, 85. The other end of said tie or chain 85 is secured to a second hook 86 in line with the first hook 84 and secured to a supplemental upright member 87 of the main frame.

The function of the tie or chain 85 is to arrest the outward movement of the skid supporting frame 46 while permitting continued movement of the carriage 58 through the sprocket chain 71 and thereby cause the cam plates 55 to move with the carriage 58 and effect the vertical movement of the skid supporting frame 46 through the rollers 53 and depending arms 52 of the carriage. This places the carriage and its parts in the solid line position thereof in FIG. 1 ready for the subsequent placement thereon of a new skid and its load of blank stacks 45.

In the meantime, and again, through control means subsequently to be described, a motor 88 is energized for rotating a shaft 89 on which are mounted a series of belt pulleys 90 each having extending therearound a belt 91.

It should be noted that the said belts, see FIGS. 2 and 7, are spaced from one another laterally of the machine to each enter the space 30 between adjacent longitudinal members 29 of the skid now over said belts. As a matter of fact each belt 91 passes over an idler pulley 92 rotatably supported by the sub-supporting frame 87 and, in addition, each belt 91 passes over a pulley 93 and 94, respectively, located at the opposite ends of the said super-imposed skid. As a matter of fact the said belt pulleys or wheels 93 and 94 are each slightly inwardly of the skid end members 21 and 22 and have the upper point of their peripheries upwardly of the upper coplanar surfaces 27, 28 and 31 of the skid ends and longitudinal members as is the upper stretch 95 of the belts 91 and, now, actually said belts upper surfaces support the stacks of blanks 45 above the upper surface of the skid end and longitudinal members 25, 26 and 29. In other words, the upper three of the belts 91, as shown in FIG. 2 are under the upper row of carton blanks stacks 45 while the lower three of the belts 91 are under the lower row of said carton blanks stacks 45.

In order to fully understand subsequent operation of the machine the lower row of carton blanks stacks 45 are numbered (1), (2), (3), and (4) while the upper of said row of carton blanks stacks 45 are respectively indicated by (5), (6), (7) and (8). From the foregoing it will therefore be realized that carton blanks stacks (1), (2), (3) and (4) are on the lower three of the belts 91 while the stacks (5), (6), (7) and (8) are on the upper of said belts.

The energization of the motor 88 therefore causes rotation of the said belts 91 for moving the stacks of blanks from the skid onto a series of belts 96 associated with the individual stack transfer mechanism 42.

Figure 6:
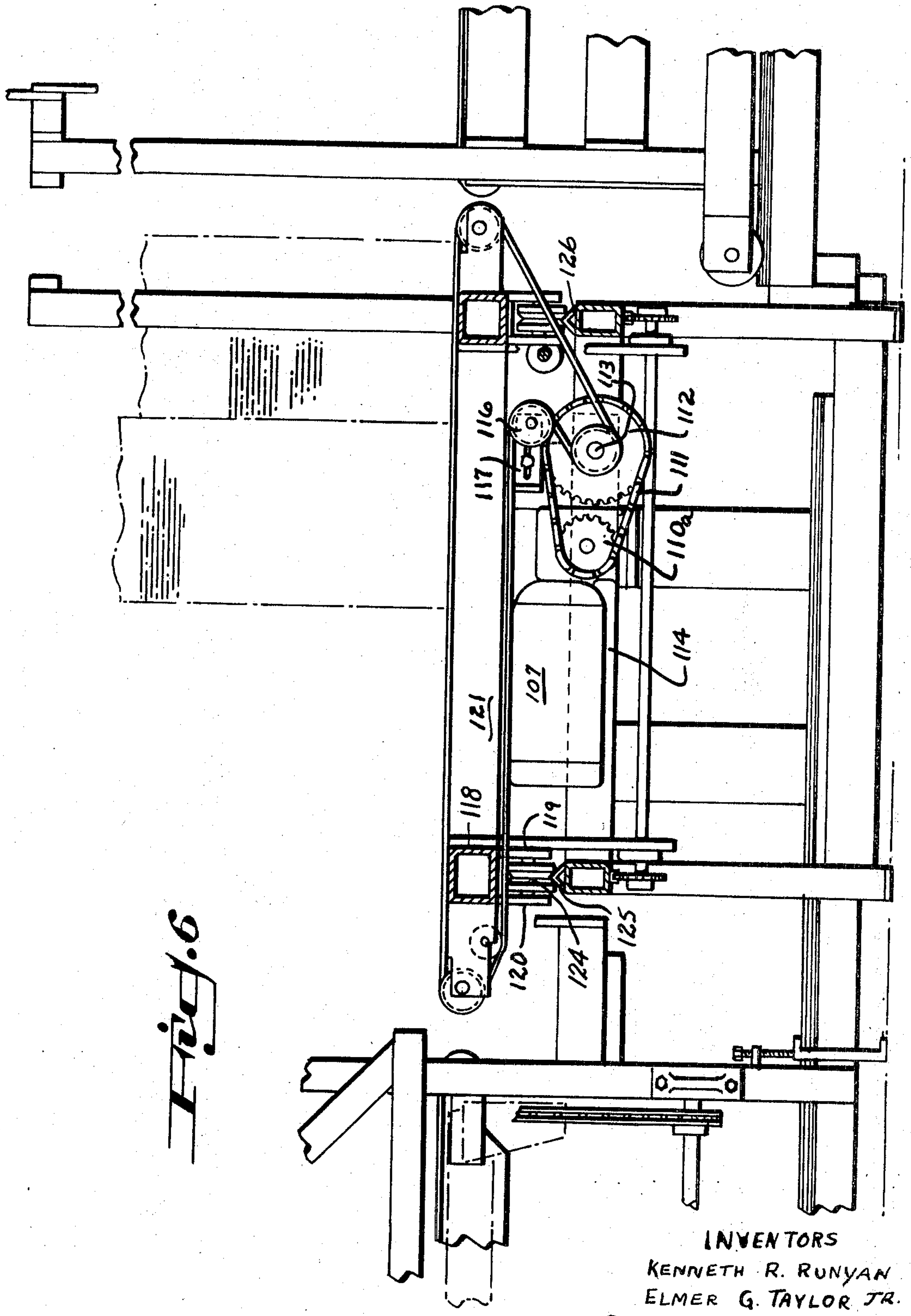
FIG. 6 is an enlarged, longitudinal view of the third section of the feeding mechanism of the present invention as seen from line 6—6 on FIG. 2.
Figures 8, 10:
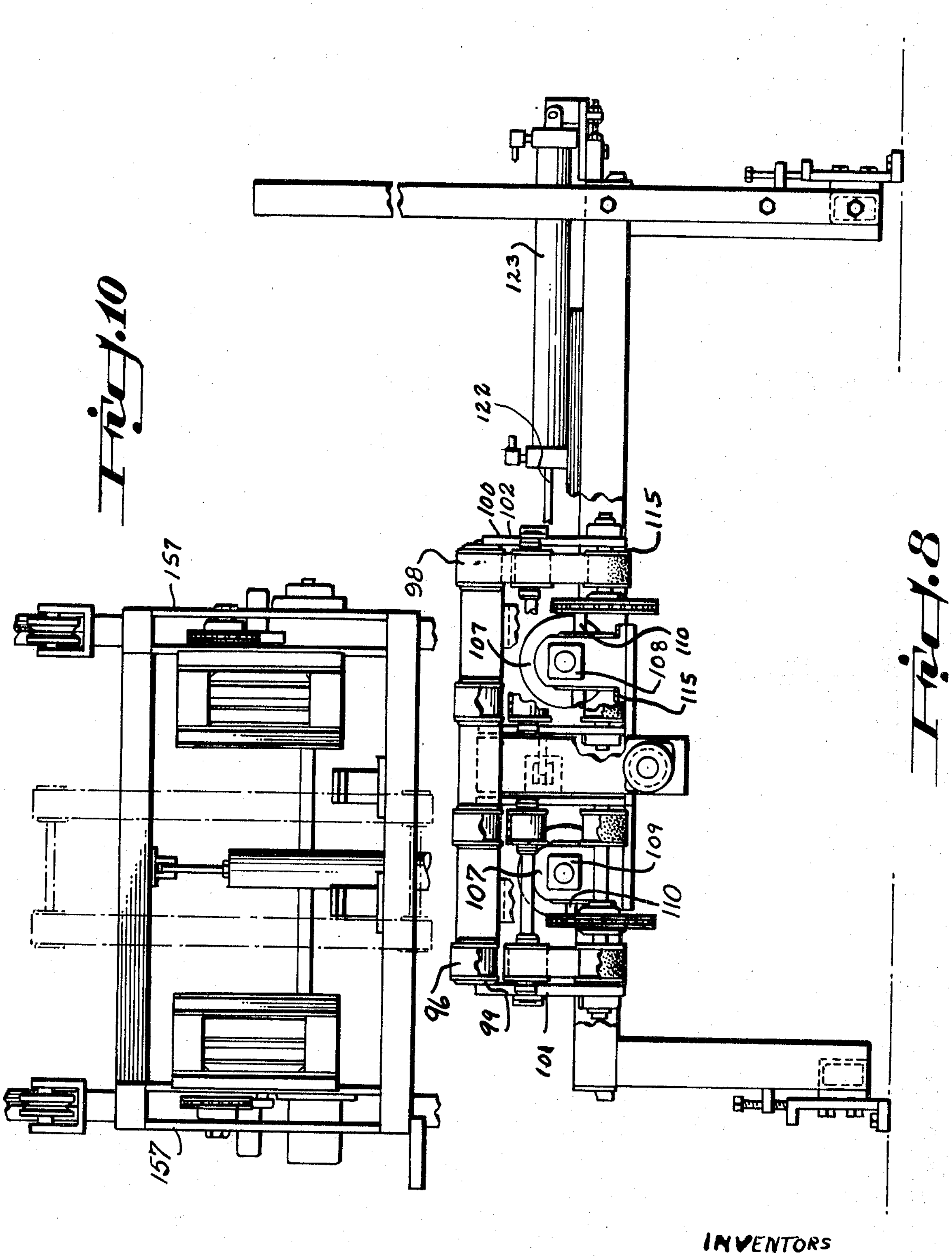
FIG. 8 is an enlarged, fragmentary, sectional view vertically of the feeding mechanism illustrating the third section of the machine as seen from line 8—8 on FIG. 2.
FIG. 10 is a horizontal, sectional view through the fourth section of the machine as seen from line 10—10 on FIG. 9.

The belts 96 are four in number, see FIGS. 6 and 8, with two of the belts, lower two as seen in FIGS. 2 and 8, passing over similar belt pulleys or wheels 97 and 98, respectively mounted on shafts 99 and 100 again, respectively, carried by upstanding shaft supports 101 and 102. The upper two of said belts 96, similar to the lower two, are mounted on similar pairs of belt pulleys or wheels 103 and 104 respectively carried by shafts 105 and 106. In order to rotate or actuate said belts 96 there is provided a pair of motors 107 each having its shaft, not shown, interior of a separate speed reducer 108 and 109, in turn each speed reducer has extending therefrom a similar shaft 110 to the outer ends of which shafts, respectively, see FIG. 6, is secured a sprocket 110*a*. Since each speed reducer shaft drives a similar train of rotating mechanism, only one will be described. The sprocket's speed reducer shaft 110, see FIG. 6, has trained thereabout a sprocket chain 111 in turn extendng about a speed reducing sprocket 112 secured to a driving shaft 113 supported in transverse frame members or supports 114.

The said driving shaft 113 has secured thereto, in addition, see FIG. 8, a belt pulley 115 around which the lower pair of belts 96 are trained and on the second drive shaft the upper pair of belts 96 are trained. The belt pulleys 115 may be said to be the driving pulley for the belts 96 and which belts are in addition trained around idler and slack take-up pulleys or belt wheels 116 each at one end of an adjustable spring loaded member 117 again secured to a portion of the mechanism fixed frame.

The upstanding pulley support members 101 and 102 are spaced from one another by frame members 118 which conveniently take the form of a rectangular metalic beam and have depending from the sides and bottom thereof wheels supporting arms 119 and 120. The said wheel supporting arms 119 and 120 are located at each corner of the frame which supports the pulleys or belts wheels 97 and 98.

Said transverse members 118 are joined to one another by longitudinal plates 121 which has secured at its underside the motors 107 and said connecting plate 121 provides a movable carriage for the shifting of stacks of carton blanks from the skid.

As shown in FIGS. 2 and 8 the belts 96 are four in number with the said belts located with respect to the skid transfer belts 91 so that the upper two of the belts 96 cooperate with the upper three of the belts 91 while the lower two belts 96 cooperate with the lower three skid transfer belts 91. In other words, the stacks (1), (2), (3) and (4) are transferred from the lower three skid transfer belts 91 to the lower two of the belts 96 while the remaining carton blank stacks (5), (6), (7) and (8) are transferred onto the upper of the two belts 96.

Through control mechanism, hereinafter to be described, see FIGS. 2 and 8, a piston 122 projecting from a cylinder 123 is drawn into said cylinder 123 for transferring or moving the stack platform transversely, that is, upwardly or rearwardly as seen in FIG. 2, to the other side of the machine. In other words the stack frame is moved by the piston and cylinder on its grooved wheels 124, respectively, on the peaked tracks 125 and 126 provided therefor.

By this construction the lower pair of belts 96 of the carton blank transfer mechanism, the belts having thereon carton blank stacks (1), (2), (3) and (4) is in the position now illustrated for the said upper pair of said belts 96 which now has mounted thereon the carton blank stacks (5), (6), (7) and (8).

As soon as this transverse shifting has been effected, again, through control mechanism hereinafter to be described the motor 107 for the lower pair of transverse belts 96 is energized for moving the row of stacked carton blanks (1), (2), (3) and (4) allowing the belts 96 supporting the remaining stacks (5), (6), (7) and (8) to remain stationary. The operation of the lower stack transfer belts 96 transfers the stacks individually to the stack placement unit 43 for eventual individual blank transfer to the subsequent operating machine for subsequent carton blank operation.

The individual stack lifting mechanism as seen in FIG. 11 comprises a lower frame or platform, indicated in its entirety by the reference numeral 127, including side members 128 joined to one another through transverse metal rectangular beams 129. Projecting from each end of each longitudinal side member ar spaced arms 130 between which extend axles 131 for grooved wheels 132. The grooved wheels on each side of the platform are mounted on peaked trackways 133 for guiding the platform in its movement.

Mounted on the platform for movement therewith is an hydraulic motor 134 having a shaft 135 to the outer end of which is secured a chain pulley or sprocket 136 for a driving sprocket chain 137 which sprocket chain is in turn extended over a sprocket wheel 138 suitably rotatably carried by the platform, specifically, an upright 139. The sprocket 138 shaft 140 has thereon a second sprocket 141 about which is trained a sprocket chain 142.

The sprocket chain 142 has one end 143 thereof secured to a bracket 144 forming a part of the platform 127. The sprocket chain 142 after passing around the sprocket 141 passes over a second sprocket 145 secured to a shaft 146 rotatable in members 147 at the upper end of an elevator supporting frame indicated in general by the reference numeral 148. The sprocket chain 142 depends from the sprocket wheel 145 to have its other end 149 secured to a bracket 150 forming a part of an elevator mechanism.

Figure 9:
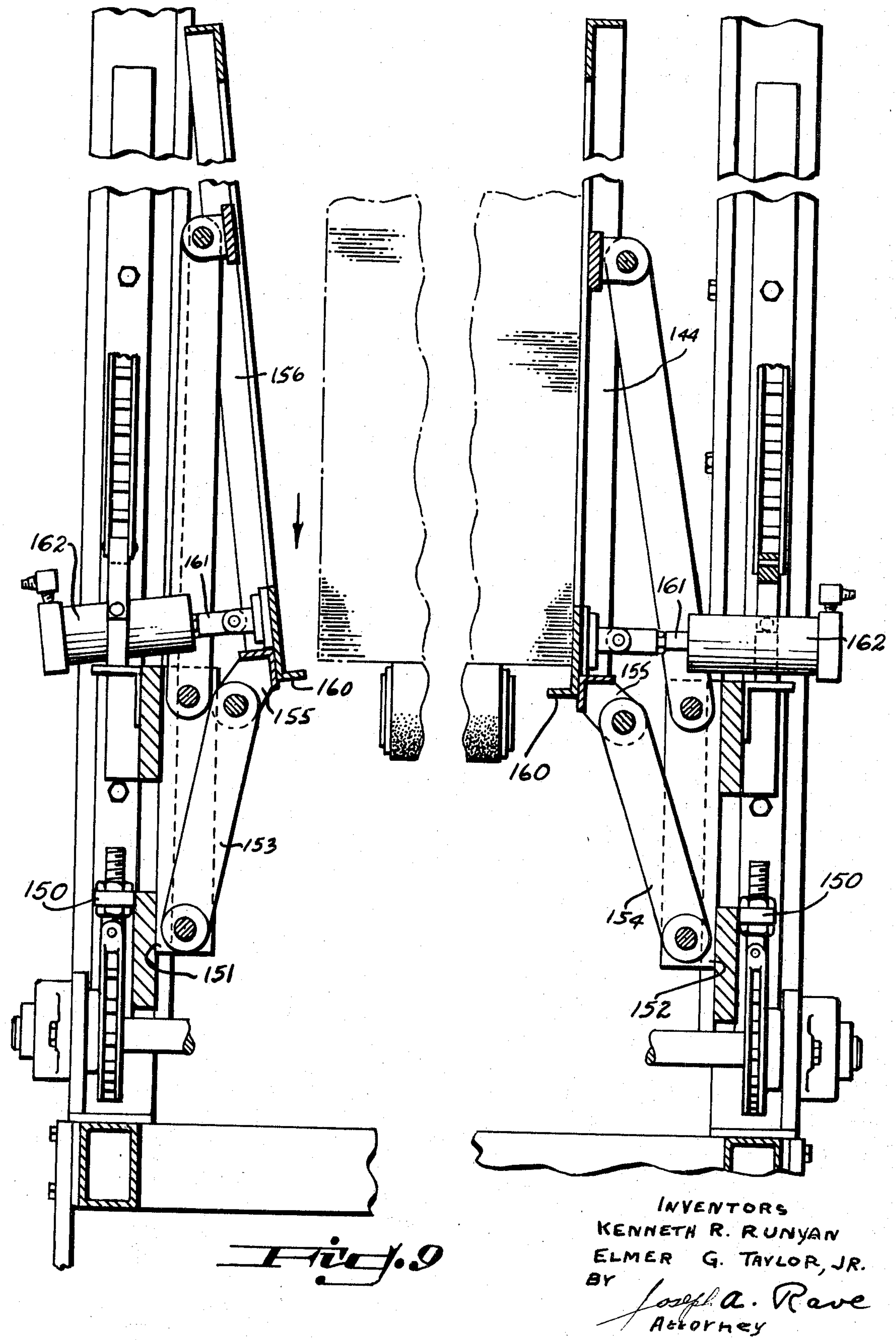
FIG. 9 is an enlarged, vertical, fragmentary, sectional view through the fourth section of the mechanism as seen from line 9—9 on FIG. 2.

The elevator mechanism comprises a pair of vertically moving elevator slides 151 and 152 and rearwardly from each of which extend the attaching bracket 150 for the elevator chain 142. Each of the elevator slides 151 and 152 has pivotally connected with its lower end arms 153 and 154 each of which in turn has pivoted to its upper or free end a bracket member 155 which are substantially identical in construction and together are the elevator or lifters. Each of said member 155 has connected therewith a frame consisting of a pair of vertical members 156 joined at their upper ends, see FIGS. 9 and 10, by a transverse member 157, at their lower ends by a transverse member 158 and intermediate their ends by a member 159.

The lower ends of each frame and particularly the vertical members 156 are provided with an inwardly projecting finger or shoe 160 adapted to underlie a single stack of carton blanks when in position to be picked up thereby.

The arms 156 are actuated from their inoperative position to their operative positions and with their respective fingers 160 below the stack, respectively, by a separate piston 161 operable within a cylinder 162.

The hydrauic fluid for operating the pistons 161 is effected through control means hereinafter set forth and which control means are energized when the stack is in position to be picked up.

As soon as the gripper fingers or shoes 160 and the stack, present stack (1), are in their upward operative position a control mechanism, as will hereinafter be set forth, is operable for energizing a piston 163 within a cylinder 164 for through its piston rod 165 actuating the elevator mechanism and parts carried thereby to the right as seen in FIG. 11. In other words, the platform 127 for the elevator is actuated and moved on its rollers or wheels 132 and track 133 to position the carton blank stack carried thereby over the discharge mechanism indicated in its entirety by the reference numeral 166.

The mechanism 166 is, what was termed above, the fifth section, or the discharge section and indicated in general by the reference numeral 44.

The said discharge or feeding end 44 comprises a supporting table 167 over which is mounted an endless belt 168. The table 167 has depending from each of its longitudinal edges a side member 169 adjacent the ends of which are shafts 170 and 171 on which, respectively, are belt pulleys or wheels 172 and 173.

The table 167 is mounted in its operative position through a pivot carried by the bracket 174, see FIGS. 1 and 11, on the inner face of uprights 175 of the mechanism frame.

The belt 168 projects outwardly of the pulley 170 in a downward direction and passes over a belt pulley or wheel 177 supported by a bracket side 178 carried the table 167 by and outwardly of the main frame vertical member 175. The belt 168 after passing over the wheel or pulley 177 passes around a lower belt wheel or pulley 179 and a second idler belt wheel or pulley before passing over the belt wheel or pulley 172 to the belt or pulley 171. A driving mechanism for said belt comprises an hydraulic motor 180 secured to and depending from the supporting table side frames 169.

At the end of the table 167 there is provided an upstanding positioning member 181 for positioning one side of the carton blank stack as it is being arranged above the discharge belt 168. Spaced from the said upright 181 is a plate 182 for positioning the other face of the said folded carton blank stack. The space, between the stack positioning members 181 and 182 is therefore equal to the stack of blank cartons in one dimension, and said space constitutes a hopper 183 for the carton blanks.

Mounted near the upper end of the upright stack positioning member 181 is a light source or electric bulb 184 which is a part of a control mechanism including an electric eye or cell 185 in horizontal alignment with the light source 184. The line of arrows 186 indicates that the beam of light between the said light source 184 and electric eye or cell 185.

Mounted exteriorly of the machine upright or supporting frame 175, as noted above, is the discharge mechanism 166 which includes a roller type mechanism for holding the individual carton blank on the belt 168 as they are being individually discharged from the machine. This roller type mechanism comprises a pair of side members 187 pivoted at 188 to the machine upright 175. The side members 187 are in turn, outwardly of the pivot 188, pivoted at 189 to an arm 190 which depends from a bracket 191 outwardly projecting from the machine upright 175.

Intermediate the ends of the side plates 187 and substantially centrally longitudinally of said plates are pivots 192 and 193 respectively pivotally mounted a lever 194 and 195. Depending from the free ends of said levers 194 and 195, respectively, is a member 196 and 197, respectively, each having pivoted to its lower end an arm 198 and 199 each carrying at its outer end a roller 200 and 201 which overlies the downwardly inclined portion of the belt 168 and which rollers 200 and 201 due to the pivoting of their arms 198 dispose the same at the angle of the belt 168 immediate therebeneath for thereby contacting the upper surface of the said belt 168 to hold the cartons as they discharge from the hopper 183.

In order to hold the rollers 200 and 201 and their respective rocker arms 188 and 189 in their operative positions they are each provided with a spring 202 and 203 carried by the frame sides 187.

Mounted at the outer end of frame sides 187 is an hydraulic pressure fluid flow valve 204 having secured thereto for operating the same a trigger 205. The trigger 205 is adjusted through an adjusting screw 206 so that it will operate each time a carton blank is discharged by the belt 168 into the hopper 207 of the succeding machine. At the same time the trigger is held in a position for maintaining the valve 204 open so long as a discharge is being effected through the throat between the discharge belt 168 and its over-riding rollers 200 and 201.

It should be here noted, and as will be hereinafter more clearly pointed out, the hydraulic motor 180 under the control of the trigger 205 is operable only while the hopper 183 contains folded cartons above the light line 186. In other words when sufficient cartons have been discharged from the hopper 183 to make the upper surface of the remaining stack of cartons on the discharge table 167 and its belt 168 permits the said light to travel in a pth as indicated by 186 then the motor 181 is stopped. For this reason, and as will be more particularly hereinatfer set forth, the feeding mechanism can only be started with a stack of blank cartons above the light line 186 and the disposal on the upper blank carton above said light line, and, which during operation of the mechanism, is a full stack of carton blanks discharged from the elevator or lifting mechanism.

Before describing the operating and control mechanisms it should be noted that as soon as the last two stacks, namely, stack (4) and (8) pass off of the skid onto the belts 96 a signal is given to remove the said skid from the mechanism section 41.

As seen in FIG. 7 and with the skid in the position thereof illustrated in broken lines a pair of lift fingers 211 and 212, on each side of the said skid, are respectively pivoted to brackets 213 and 214 carried, respectively, by transverse plates 215 and 216. The pivotal mounting of the said fingers 211 and 212 is respectively on pivots 217 and 218 with said fingers, respectively yieldably held in the positions illustrated therefor in said FIG. 7 by leaf-springs 219 and 220. Said leaf-springs are pivoted to encircle the finger pivots 218 and 219 and each of said leaf-springs has a tail, respectively, 221 and 222 abuting an abutment 223 and 224 respectively associated with the slides 215 and 216. Said springs 219 and 220, respectively, have their operating fingers on abutments 225 and 226.

The said transverse or slide members 215 and 216 have, respectively, secured to their opposite ends at 227 and 228 and 229 and 230 the opposite ends of a pair of actuating sprocket chains 231 and 232. The chains 231 and 232, respectively, pass over sprockets 233 and 234, respectively, at the upper and lower ends of frame uprights 235 and 236.

From the foregoing it will be noted that the rotation of the sprocket wheels 233 and 234 in the same direction on each side of the machine will cause the sprocket chains 231 and 232 to pass either in an upward or a downward direction. At this time it is to be noted that the said chains will be moved in such a direction to lower the transverse members 215 and 216 along with the fingers 211 and 212 essentially carried thereby. As soon as the said fingers 211 and 212 engage with the upper surface or longitudinal corner of the skid outer longitudinal members 23 and 24 the said fingers 211 and 212 are actuated against the resilience of springs 217 and 218 for retreating them until they have passed beneath said skid side longitudinal members 23 and 24 whereupon the said springs will return the fingers at their normal positions as illustrated in FIG. 7, now below, as noted above, the said longitudinal members 23 and 24.

As soon as this position of the said fingers is reached the rotation of the sprockets 233 and 234 are reversed for thereby effecting the upward movement, or elevation, of the transverse members 215 and 216 and thereby the fingers 211 and 212 and the skid.

The said sprocket chains 231 and 232 have their upper sprockets 234, respectively, secured to a shaft 237 and 238 suitably journaled in bearings provided by the uprights 235 and 236. Also carried by said shafts 237 and 238, respectively, are driving sprockets 239 and 240 about which is trained, respectively, sprocket chains 241 and 242 and which sprocket chains are likewise trained around sprockets 243 and 244 projecting from a gear box 245.

In view of the foregoing it is readily understood that the chains 231 and 232 are driven from a motor connected with the gear box 245 and gear box shafts 243 and 244 for first lowering the transverse members 215 and 216 to pick up an empty skid and then raise said skid upwardly of the feeding mechanism.

Near the upper end of the uprights 235 and 236 there is provided cam plates 246 and 247 each having an upwardly outwardly inclined surface 248 and 249 which engage the longitudinal edges of the skid as it passes thereby and to insure that the skid is properly positioned on the fingers 211 and 212.

Just upwardly of the cam plates 246 and 247 there is respectively mounted additional plates 250 and 251, again, each including a tapered surface, respectively, 252 and 253 for again centralizing the skid. Just below the said positioning plates 250 and 251 a third pair of plates 254 and 255 are carried by the uprights 235 and 236 and which plates have respectively pivotally mounted thereon retaining fingers 256 and 257.

The upward movement of the transverse members 215 and 216 along with their carrying fingers 211 and 212 continues until the skid on said lifting or carrying fingers 211 and 212 passes the fingers 256 and 257. The movement of the skid relative to the fingers 256 and 257 causes same to be upwardly pivoted, respectively, on their pivot pins 258 and 259 and at the same time tensioning springs 260 and 261 associated with said fingers. After the fingers 256 and 257 have passed the said skid sides, the said fingers are returned to their illustrated operative positions and the said elevating chains 241 and 242 are then, through remote control mechanism subsequently to be described, reversed to bring the skid to the holding fingers 256 and 257 to be retained thereon while the said lifting fingers 211 and 212 continue for a short distance below, that is, to the position thereof as illustrated in FIG. 7.

As noted above the removal of the skid and its load from its supporting carriage while outside the machine permits the said carriage to be returned to its position and a second skid with a second load placed thereon. As soon as each skid has been positioned on the carriage supporting portion of the mechanism the said skid is brought into operative position for subsequent elevation and mounting on the fingers 256 and 257 obviously after the removal of its load of stacks.

It should be noted that the second and subsequent skids upon being elevated, through the shoulders 36 at the upper ends of the skid legs 32, pick up and carry with it the skid, or skids, previously stored so that eventually a number of skids, there being space enough for four (4) skids, are picked up by a fork truck and the stack of skids removed from the skid compartment.

It should be here noted that the stacks of carton blanks 45 on the second and subsequent skids is retained in this position until the stack (5) of the previous skid is removed from the intermediate section or belts 96 and at which time the two forward stacks of carton blanks, namely, stacks (1) and (5) of the second skid are then jointly shifted onto the said intermediate position belt 96. As successive stacks (6), (7) and (8) presently on the belts 96 are placed in position on the individual stack lift mechanism the successive pairs of stacks, such as, (2) and (6), are moved until the final stack (8), of the first skid load has been removed and the second skid load is now completely on the intermediate belts 96. At this time the second skid load is shifted rearwardly of the machine to align the lower row of stacks with the elevating mechanism belts.

It is to be understood that these movements are all automatically effected as will presently be made clear.

The foregoing is substantially a complete cycle of operation of the first skid load and subsequent skid loads and for the complete automatic feeding of skid loads to a hopper of a subsequent machine for operation on the carton blanks.

In order that the feed mechanism will operate as above described it is necessary that the hopper 207 of the succeeding machine, that is, carton blank folding and securing machine, be substantially full as illustrated in FIG. 1 and that the hopper 183 of the present mechanism be filled to the light path or line 186; at which time the following control and actuating mechanism is effected, and assuming that there is a skid with eight stacks of carton blanks on the carriage as seen in FIG. 1.

The electrical control mechanism and system is illustrated in FIG. 15 and comprises the main or outside commercial electric current lines 266 having therein main control switch 267 to the electric motor feed lines 268, 269 and 270. The said current voltage across the lines 268 and 270 is fed into a transformer 271 to provide an electric circuit including lines 272 and 273 for the various operating switches and the like. In order to insure the operator of current flow through the lines 272 and 273 there is in line 272*a* an indicator lamp 274. Extending from the feed line 272 to the feed line 273 is a wire 275 including a manually operable switch 276 and with said line including a light 277 to indicate current flow.

A parallel cross line 278 from the feed line 272 to 273 has therein a manually operable switch 279 and a motor control solenoid 280. The said solenoid 280 is adapted to close normally open solenoid switch contacts 281 between the electric feed lines 268–270 and a motor 282. The motor 282 as will later be made clear, operates a hydraulic pump for developing the necessary pressure for operating the various motors, supra. Normally closed overload contact switches 283 are in the motor control solenoid cross wire 278 to protect the said motor.

In a cross wire 284 below the cross wire 278 is a stop and start manual switch 285 and 286 with the stop switch normally closed and the start switch normally open. In addition the said transverse line 284 has therein a solenoid switch coil 287.

The closing of the starting switch 285 energizes the solenoid coil switch 287 and at that time closes normally open solenoid switch contacts 288 in feed lines 272 and closes normally open solenoid switch contacts 289 in the return current feed line 273. At the same time solenoid switch contacts 290 and 291, respectively, in transverse lines 292 and 293 are closed.

At this time the manually operable switch 294 operable between contacts in transverse feed lines 295 and 296, have the said switch in closed position in the line 295 since it is desired to automatically operate the feeder. During and while setting up and the like the switch 294 may be closed for completing the circuit in the line 296.

At this time also, the manually actuable switch 297 in transverse line 298 is closed and which line 298 has therein normally closed now closed solenoid switch contacts 299, normally open solenoid switch contacts 300 and solenoid switch coil 301. At this time also a strap line 302 bypasses the solenoid switches 299 and 300 and has therein a manually actuable switch 303 and which switch initiates the feeding of the new skid load from the skid loading position to the position where the carton blank stacks are removed from the skid to the transfer belts, supra. Therefore, after the operator has inspected the skid load and finds same in proper condition, that is, its various stacks in proper relation to one another and to the machine as a whole, he closes manual switch 303 energizing solenoid coil 301.

The energizing of the solenoid switch coil 301 closes the normally open solenoid switch contacts 300 so that when manually operable switch 303 is released the circuit is maintained.

The operator now presses manually operable switch 304 in the line 305 that extends as a strap between transverse line 306 and 307. It should be noted that the transverse line 306 is connected by a supplemental feeder line 308 from the transverse line 298 and which, as noted above, has a current flowing therethrough due to the closing of the manual switch 297. It should also be noted that the strap line 306 is connected through a solenoid switch coil 309 in the transverse line 307 which extends between the supplemental feeder line 308 and the main current return feeder line 273 and whereby the closing of the switch 304 energizes the solenoid switch coil 309.

The energization of the solenoid switch coil 309 closes normally open solenoid switch contacts 310 in the strap line 306 and which strap line 306 also has therein a limit switch 311 normally closed and through which circuit including the solenoid switch contacts 310 the solenoid coil 309 remains energized even though the switch 304 is open.

The energization of the solenoid coil 309 also closed normally open solenoid contacts 311*a* in cross line 312 which extends from the current feed line 273 to the current return line 272 and with said cross line 312 also including a normally open now closed limit switch 313 and a valve solenoid 314.

As shown in FIG. 16 the solenoid coil 314 is associated with a three position valve 315, the first or neutral position of the said valve being shown. The energization of the solenoid coil 314 shifts the valve against the spring 316 associated therewith for thereby connecting the hydraulic system pressure line 317 and the hydraulic system exhaust or return line 318 for actuating the motor 319 for driving the hydraulic motor 63 and thereby effecting the movement of the carriage with its stacks of carton blanks from the station, over the skid carriage, 40 to the station, load and skid return, 41.

The skid with its stacks of carton blanks and the carriage therefor are lowered and the limit switch 311 is opened while its connected limit switch contacts 320 are closed. The closing of the limit switch 320 and the previous closing of the manually operable switch 294 effects a flow of electric current through the line 295 for energizing the solenoid switch coil 321. Obviously the closing of the limit switch 320 opens the limit switch contacts 311*a* and thereby de-energizes the current flow to the solenoid coil 309 for opening the solenoid contacts 311*a* and de-energizing the valve solenoid 314 and permitting the spring 316 to centralize the valve 315 and thereby stop rotation of the motor 319.

The energization of the solenoid switch coil 321 closes the normally open solenoid switch contacts 322 in line 323 which also includes normally closed solenoid switch contacts 324 now closed since they are under the control of solenoid coil 309 now de-energized.

At this time the normally closed limit switch 325 in the line 326 between the supplemental feed line 308 and cross line 327 is opened. At this time, also, the normally open limit switch 313, physically connected with the limit switch 325, is closed for thereby establishing electric current flow through line 312, limit switch 313, solenoid switch contacts 324, contacts 322, valve solenoid coil 328 and the return current feed line 273 for thereby energizing the said valve solenoid coil 328.

By reference to FIG. 16 it will be noted that the solenoid valve coil 328 is connected with the valve 315 for shifting the same against a spring 329 and connecting the hydraulic current flow from the pressure line 317 and exhaust line 318 for reversing the rotation of the said motor 319 and thereby returning the skid carriage to its outer position.

As soon as the skid reaches its outermost position limit switch 330, normally closed, is opened for disrupting the current flow through strap line 331, normally open solenoid switch contacts 332 and de-energizing the solenoid switch coil 321 for thereby opening the now closed normally open solenoid switch contacts 322 and thereby de-energizing the valve solenoid 328 and permitting the spring 329 to centralize the valve 315 and thereby again de-energizing the motor 319 since the skid carriage is now in its outermost position awaiting a new skid load.

The skid on being lowered to its lowermost position closes limit switch 332*a* in cross line 333. This cross line 333 has therein normally closed limit switches 334 and 335, normally closed solenoid siwtches 336, normally closed limit switch 337 and motor 338.

From the foregoing it will be noted that the closing of the limit switch 332*a* energized the motor 65 which operates the belts to remove the stacks of carton blanks 45 from the skid onto the transfer belts.

At the same time motor 339 in strap line 340 extending from the cross line 333 and the feed line 273 and the motor 341 in cross line 342 are energized. It should be noted that the cross line 342 has therein normally closed limit switch 343 and normally closed solenoid switch contacts 344. From this it follows that the simultaneous rotation of the motors 338, 339 and 341 the stacks of carton blanks are being moved from the skid belts onto the transfer belts and that all four of the transfer belts are being simultaneously operated and at the same time by each of the motors 339 and 341.

After all eight stacks of blank cartons have been transferred from the skid to the transfer table the stack (5) operates the normally closed limit switch 335 while the stack (1) closes normally open limit switch 345 in cross line 346. The opening of the normally closed limit switch 335 brakes the circuit in line 333 and thereby de-energizes the motors 338 and 339. This closing of the limit switch 345 is effected simultaneously with the opening of limit switch 334. The cross line 346 has therein a solenoid switch coil 347 which is now energized. The energization of the solenoid switch coil 347 automatically opens normally closed solenoid switch contacts 348 and automatically closes solenoid switch contacts 349. The opening of the solenoid switch contacts 348 de-energizes the current flow through line 351 extending from the current feed line 272 to the return current feed line 273 and at the same time de-energizes valve solenoid coil 353 in the said cross line 351.

The closing of the normally open solenoid switch contacts 349 energizes the cross line 350 from a point in cross line 351 ahead of the said normally closed solenoid contacts 348 and the current return line 273, and thereby energizes the valve solenoid 352.

As shown in the hydraulic control diagram, FIG. 16, the valve solenoids 353 and 352 are at opposite ends of a valve 354 which connects the hydraulic system pressure and exhaust lines 317 and 318 with the hydraulic piston and cylinder mechanism which shifts the stack transfer table to its offset position and aligns the lower two transfer table belts, those having thereon the carton blank stacks (1), (2), (3) and (4), with the stack raising mechanism transfer belts.

After the transfer table reaches its rear position it operates a limit switch 355 and at the same time closes the limit switch 358. The limit switch 355 is in a cross line 356 between the feed lines 272 and 273 and which cross line also includes a solenoid switch coil 357.

When the shift of the transverse table has been completed limit switch 355 in line 356 is opened and its companion limit switch 358 is closed and thereby energizes the motor 341 in the line 342 for thereby transferring the stacks (1), (2), (3) and (4) individually to the individual stack raising and positioning mechanism.

When the stack (1) of the carton blanks is fully on the lift table it opens limit switch 360 in transverse line 342 and thereby de-energizes the motor 341 and thereby permits the stopping of the motor 341 and the stopping of the lower two transverse belts.

The said stack (1) of carton blanks continues to move until it closes normally open limit switch 361 in cross line 292 and at the same time opens the limit switch 362 in cross line 363. The opening of the limit switch 362 discontinues the rotation of the feeder table motor 364 in said cross line 363.

At this time the limit switch 365 in line 292 is closed and its companion limit switch 343 is open and the motor 341, although stopped, is held stopped even though the normally closed solenoid switch now open, is closed. The closing of the limit switch 361 permits electric flow through the portion of the line 292 beyond the said limit switch 361 from the feed line 272 and through a line 366 which includes valve solenoid 367 for energizing same. The energization of the valve solenoid 367, as seen in FIG. 16, shifts the valve 368 from its present position to its second position for connecting the hydraulic pressure and exhaust lines 317 and 318, with the piston and cylinder mechanisms 163 and 164 for inserting the lifting fingers beneath the stack of carton blanks now on the lift table.

When the lift arms have reached their operative positions the normally open limit switch 369 in line 292 is closed for operating hydraulic valve solenoid coil 370. The energization of the valve solenoid coil 370, see the hydraulic diagram in FIG. 16, shifts the valve 371 against the resistance of spring 372 for effecting the upward movement of the stack (1) of carton blanks.

The upward movement of the said stack of carton blanks releases the limit switches 361 and 362 for thereby closing the circuit to complete, again, the circuit for the motor 364 to bring in the second stack (2) onto the lift table. At the same time the limit switch 373 in cross line 374 is closed and which cross line 374 includes the photo cell light 375 (light bulb 184). The closing of the limit switch 373 completes the electric circuit through the line 374 for energizing the valve solenoid coil 376 therein.

The energization of the valve solenoid coil 376, see FIG. 16, shifts the valve 377 for connecting the pressure and exhaust lines 317 and 318, as shown in said FIG. 16, with the piston and cylinder mechanism which moves the lift mechanism from its initial upper position to a position over the hopper.

At this time the limit switches 361 and 369 in cross line 292, limit switch 378 in cross line 293 and limit switch 360 in line 342 are opened. The valve solenoid coils 367 and 370 are at this time de-energized and when the stack lift is over the hopper a limit switch 379 in cross line 292 is opened and the valve solenoid coil 370 in line 292 is de-energized and the companion limit switch 380 in cross line 293 is closed. At this time the cross line 293 has therein closed limit switch 381, closed limit switch 378 normally open now closed limit switch 380, normally open now closed solenoid switch contacts 291 and valve solenoid coil 382. It will thus be seen that valve solenoid coil 382 is energized and which valve solenoid coil 382, see FIG. 16, is connected with valve 371 for shifting said valve to its second position and cause the lift arms with its stack of carton blanks to descend to the top of the cartons presently in the feeder mechanism hopper. This shifting of the valve 371 is against the resistance of spring 382*a* so that upon de-energization of solenoid coil 382 the valve 371 returns to its neutral position.

When the lift arms start down the limit switch 373 is opened and the valve solenoid coil 376 de-energized. The descent of the lift arms and carton blank stack, carried thereby, effects a contact with the carton blanks in the hopper and a limit switch 383 in cross line 384 is closed for thereby energizing valve solenoid coil 385 in said cross line 384.

The valve solenoid coil 385, see FIG. 16, is associated with valve 368, for shifting said valve 368 to its second position and thereby return the lift finger clamps to their normal unclamping position and thereby effect the release and deposit the new stack of carton blanks onto those then in the hopper. The said lift fingers continue to the bottom of their stroke whereupon limit switch 386 is opened and line 293 thus becomes de-energized and the valve solenoid coil 382 de-energized to permit the valve 371 to be centralized or neutralized with respect to the hydraulic medium flow. At this time the signal light in the light beam circuit 375 is interrupted for thereby de-energizing valve solenoid 376 and effecting a current flow through the light 387 and the energization of the solenoid coil 388. The energization of the coil 388, see FIG. 16, shifts the valve 377 to its second position for thereby returning the clamp and lift arms to their normal position.

At this time, and as set forth above, the second stack of carton blanks is on the lift table and the switch 365 is again actuated to cause the lift arms to be positioned to clamp the stack therebetween.

Upon the clamping of the second stack the lift arms are then elevated to a point above the hopper and the said lift arms and stack is traversed to a point over the hopper and where the said stack and arms remain until the stack presently in the hopper is lowered to a point for again establishing a light path between the signal light and the electric eye.

As noted above this electrical lamp is in effect a solenoid arrangement for permitting a flow of electric energy to the electric cell 377 operating valve solenoid 388 thereupon a descent of the fingers until a new stack of carton blanks interrupt said light flow.

The cycle of supplying the hopper with its stack of carton blanks continues as above described until all stacks numbered (1), (2),(3) and (4) of carton blanks have been delivered to the individual feeding mechanism.

The opening of the solenoid switch 345 in the cross line 346 de-energizes the solenoid coil 347 whereupon the normally closed solenoid contacts 336 in line 333 are closed as is the normally closed now closed limit switch 334. At this time the normally closed now closed limit switches 334 and 335, normally closed now closed solenoid switch contact 336, normally closed now closed solenoid switch 337 and normally opened now closed limit switch **322*a* is closed for energizing the motor 301** and thereby shifting the row of stacks (5), (6), (7) and (8) individually from the transfer table to the individual stack lift mechanism.

Each of said stacks (5), (6), (7) and (8) is individually shifted from the discharge and hopper table to the hopper for having the individual items of each stack discharged.

At the time the first skid was unloaded of all of its stacks onto the transfer table the skid lift is lowered to pick up said empty skid and arrange it above the feeder mechanism so that a second skid load may be positioned on the transfer belts.

At this time and assuming that a new skid with its complement of stacks of carton blanks are on the skid carriage and the same has been visually inspected and found to be in order. At this, also, time the manually operable switch 303 is again closed and the switch solenoid coil 301 energized. The energization of the said solenoid switch coil 301 at this time closes the normally open solenoid switch contacts 389 in cross line 390 for energizing valve solenoid coil 391. The cross line 390 extends from the current feed line 272 to the current feed line 273 and, as seen in FIG. 16, the valve solenoid coil 391 is associated with a valve 392 for shifting the same against the resistance of a spring 393.

The shifting of said valve 393 connects the hydraulic pressure lines 317 and 318 with the motor which lowers the skid lift, supra, members 205 and 206, for disposing the lift fingers 201 and 202 beneath the longitudinal sides of the skid and for opening limit switch 325 and closing its companion limit switch 313 for thereby de-energizing the valve solenoid coil 391. When the skid lift reaches its lowermost position it opens normally closed limit switch 392 in cross line 298 for thereby de-energizing the solenoid switch coil 301 which opens the normally open solenoid switch contacts 389 and closes normally closed solenoid switch contacts 393 in cross line 394.

The energizing of the solenoid switch coil 301 also closes normally open solenoid switch contacts 395 in line 396 which extends from the supplemental feed line 308 to a cross line 397 which, again, extends from supplemental feed line 308 to the electric return line 273. The said line 297 has therein solenoid switch coil 398 and which is now energized by the closing of the solenoid switch contacts 395.

The solenoid switch coil 398 opens normally closed solenoid switch contacts 399 in the line 326 and at the same time closes the normally open solenoid switch contacts 400 in line 394. The opening of the contacts 399 de-energizes the valve solenoid coil 391 and the closing of the solenoid switch contacts 400 energizes a valve solenoid coil 301. The solenoid valve coil 401, as seen in FIG. 16, is associated with the valve 392 for shifting said valve against the spring 402. It being understood that the de-energization of the valve solenoid coil 391 permits the spring 393 to centralize said valve.

At this time the skid elevating arms, supra, through their fingers carry the empty skid upwardly there above to its storage area, supra, the upward movement of the skid arms again opens limit switch **322*a*. The limit switches 311 and 320 are simultaneously operated effecting the de-energization of the solenoid switch coil 321 and the de-energization of valve solenoid contact 401. At this time the solenoid switch coil 389 and valve solenoid coil 391 are energized to effect a downward movement of the lift arms and its fingers along with the skid carried thereby. This downward movement continues until the empty skid is on the holding fingers 246 and 247. As a matter of fact the said lift arms continue down until it operates the limit switch 325–313 which de-energizes the valve soleonid coil 391 and solenoid switch coil 301**.

Upon the stack lift arms reaching their normal positions and operating the limit switch 325–313 and through the energization of the solenoid switch coil 309 the operation of the solenoid valve coil 314 which effects the shifting of the carriage from its receiving position to its position to have the stacks of carton blanks removed therefrom.

At ths time a repeat of the cycle above set forth is initiated and effected.

From the foregoing it will now be noted that there has been provided a feed mechanism which will automatically continue to feed flat items, carton blanks, to a mechanism to have performed thereon additional work, such as, a folding or gluing of the blanks into a knocked-down carton. It will also been noted that from the foregoing the objects initially set forth have been accomplished.

What is claimed is:

1. In a feeding mechanism of the class described for feeding individual flat items from a stack, the combination of a skid having thereon a plurality of stacks of individual flat items, means removing each stack from said skid to a feeding mechanism, and means for feeding each individual item from the bottom of each stack in succession as said stacks are brought to the feeding means, said feeding means including a hopper into which each stack is individually disposed to have the said lowermost or bottom item fed therefrom.

2. In a feeding mechanism of the class described for feeding individual flat items from a stack as set forth in claim 1 characterized by, and said stacks removing means including a transfer means between the said stack and individual flat item feeding means for transferring said stacks as a unit to the said feeding means.

3. In a feeding mechanism of the class described for feeding individual flat items from a stack as set forth in claim 1 characterized by, and automatic means for automatically disposing successive stacks into the hopper upon completion of the feeding of the preceding stack.

4. In a feeding mechanism of the class described for feeding individual flat items from a stack as set forth in claim 1 characterized by, said stacks being received by the feeding mechanism on a skid, and means for transferring said stacks automatically from the skid into a transfer mechanism for transferring the stacks individually to the feeding means.

5. In a feeding mechanism of the class described for feeding individual flat items from a stack as set forth in claim 1 characterized by, said stacks of individual items being plural in number and arranged in rows of stacks adjacent one another on the skid, means transferring said stacks in plural number and parallel rows from the skid to a transfer means, and means for shifting the stacks individually from the transfer means and from said rows in the order thereof in said row to the individual item hopper feeding means.

6. In a feeding mechanism of the class described for feeding individual flat items from a stack as set forth in claim 1 characterized by, said stacks of individual items being plural in number and arranged in rows of stacks adjacent one another, means transferring said stacks in plural number and parallel rows from the skid to a transfer means, said individual stack feeding means being adapted to receive the rows of stacks individually, means for arranging said rows of stacks to have one row at a time for transfer to the individual feeding means.

7. In a feeding mechanism of the class described for feeding individual flat items from a stack as set forth in claim 1 characterized by, said stacks of individual items being plural in number and arranged in rows of stacks adjacent one another, means transferring said stacks in plural number and parallel rows from the skid to a transfer means, said individual stack feeding means being adapted to receive the rows of stacks individually, means for arranging said rows of stacks to have one row at a time for transfer to the individual feeding means, and means for shifting the stacks individually from said rows in the order thereof in said row to the individual feeding means.

8. In a feeding mechanism of the class described for feeding individual flat items from a stack as set forth in claim 1 characterized by, said feeding means including means adapted to receive the stacks from the skid removing means individually, and means receiving said stack for elevation above the skid removing means to and above a hopper and lowering each sack successively into the hopper for the feeding of the individual items from the bottom of each stack.

9. In a feeding mechanism of the class described for feeding individual flat items from a stack at set forth in claim 1 characterized by, said feeding means including means adapted to receive the stacks from the skid removing means individually, means receiving said stack for elevation above the skid removing means to and above a hopper and lowering each stack successively into the hopper for the feeding of the individual items from the bottom of each stack, said stacks of individual items being plural in number and arranged in rows adjacent one another, means transferring said stacks in plural number and parallel rows from the skid to said transfer means, and means for shifting the stacks individually from said rows in the order thereof in said row to the individual feeding means.

10. In a feeding mechanism of the class described for feeding individual flat items from a stack as set forth in in claim 1 characterized by, said feeding means including means adapted to receive the stacks from the skid removing means individually, means receiving said stack for elevation above the skid removing means to and above a hopper and lowering each stack successively into the hopper for the feeding of the individual items from the bottom of each stack, said stacks of individual items being plural in number and arranged in rows adjacent one another, means transferring said stacks in plural number and parallel rows from the skid to said transfer means, said individual stack feeding means being adapted to receive the rows of stacks individually, and means for arranging said rows of stacks to have one row at a time for transfer to the individual feeding means.

11. In a feeding mechanism of the class described for feeding individual flat items from a stack as set forth in claim 1 characterized by, said feeding means including means adapted to receive the stacks from the skid removing means individually, means receiving said stack for elevation above the skid removing means to and above a hopper and lowering each stack successively into the hopper for the feeding of the individual items from the bottom of each stack, said stacks of individual items being plural in number and arranged in rows adjacent one another, means transferring said stacks in plural number and parallel rows from the skid to said transfer means, said individual stack feeding means being adapted to receive the rows of stacks individually, means for arranging said rows of stacks to have one row at a time for transfer to the individual feeding means, and means for shifting the stacks individually from said rows in the order thereof in a row to the individual feeding means.

12. In a feeding mechanism of the class described for feeding individual flat items from a stack as set forth in claim 1 characterized by, and means operable after the removal of the last stack of individual items from the skid for shifting said skid to a skid storing position beyond the individual flat item feeding means.

13. In a feeding mechanism of the class described for feeding individual flat items from a stack as set forth in claim 1 characterized by, means operable after the removal of the last stack of individual items from the skid for shifting said skid to a skid storing position beyond the individual flat item feeding means, and means for positioning a second skid load of stacks of individual items to have said stacks removed therefrom upon the storage of the preceding skid.

14. In a feeding mechanism of the class described for feeding individual flat items from a stack as set forth in claim 1 characterized by, means operable after the removal of the last stack of individual items from the skid for shifting said skid to a skid storing position beyond the individual flat item feeding means, means for positioning a second skid load of stacks of individual items to have said stacks removed therefrom upon the storage of the preceding skid, and means associated with said skid removing means retaining said skid in said storage area and permitting the storage and arrangement of subsequent skids one upon the other for subsequent removal as a unit from the feeding mechanism.

15. In a feeding mechanism of the class described for feeding individual flat items from a stack the combination of a skid having thereon a plurality of stacks of individual flat items, said stacks of individual items being plural in number and arranged in plural rows adjacent one another and each row containing a plurality of stacks, means transferring said stacks in rows from the skid to a transfer mechanism, means transferring said stacks individually from the transfer mechanism to the individual item feeding means, individual flat item feeding means for feeding the individual flat items from the bottom of each stack, and means operable after the removal of the last row of said stacks from the skid for shifting said skid to a skid storing position beyond the individual flat item feeding means.

16. In a feeding mechanism of the class described for feeding individual flat items from a stack as set forth in claim 13 characterized by, and means for positioning a second skid load of rows of stacks of individual items to have the said stack rows removed therefrom upon the storage of the preceding skid.

17. In a feeding mechanism of the class described for feeding individual flat items from a stack as set forth in claim 13 characterized by, means for positioning a second skid load of stacks of individual items upon the storage of the preceding skid, and means associated with said skid removing means retaining said skid in the said storage area and permitting the storage and arrangement of subsequent skids one upon the other for subsequent removal as a unit from the machine.

References Cited

UNITED STATES PATENTS

| | | | |
|---|---|---|---|
| 2,993,315 | 7/1961 | Verrinder et al. | 214—8.5 X |
| 3,074,595 | 1/1963 | Boller | 214—8.5 X |
| 3,151,753 | 10/1964 | Verrinder | 214—6 |
| 3,269,565 | 8/1966 | Kemp | 214—6 |

RICHARD E. AEGERTER, Primary Examiner

U.S. Cl. X.R.

214—6; 271—35, 89

UNITED STATES PATENT OFFICE

CERTIFICATE OF CORRECTION

Patent No. 3,528,576 September 15, 1970

Kenneth R. Runyan et al.

It is certified that error appears in the above identified patent and that said Letters Patent are hereby corrected as shown below:

Column 17, line 8, "into" should read -- in toto to --; line 50, "sack" should read -- stack --.

Signed and sealed this 16th day of March 1971.

(SEAL)
Attest:

Edward M. Fletcher, Jr.
Attesting Officer

WILLIAM E. SCHUYLER, JR.
Commissioner of Patents